INVENTOR:
FRIEDRICH BAYER

May 21, 1963 F. BAYER 3,090,559
THERMOSTATIC MIXING VALVE
Filed May 10, 1961 3 Sheets-Sheet 2

INVENTOR:
FRIEDRICH BAYER
BY
Michael S. Striker
his ATTORNEY

INVENTOR:
FRIEDRICH BAYER

United States Patent Office 3,090,559
Patented May 21, 1963

3,090,559
THERMOSTATIC MIXING VALVE
Friedrich Bayer, Deilinghofen, Westphalia, Germany, assignor to Friedrich Grohe Armaturenfabrik, Hemer, Westphalia, Germany
Filed May 10, 1961, Ser. No. 109,110
Claims priority, application Germany May 11, 1960
11 Claims. (Cl. 236—12)

The present invention relates to mixing valves in general, and more particularly to an improved thermostatic mixing valve which may be utilized for maintaining the temperature of a mixture of two or more fluids at a predetermined level and for automatically adjusting the rate of flow of one or more fluids in response to a change in the temperature of the fluid mixture.

An important object of the invention is to provide an improved valve of the above outlined characteristics which may be accommodated in a comparatively small housing, whose component parts are readily accessible for inspection or repair, wherein the rate of flow of one or more fluids may be arbitrarily adjusted independently of the automatic adjusting action which occurs in response to a change in the temperature of the fluid mixture, wherein the desired temperature of the fluid mixture may be selected and adjusted at will, which consists of a comparatively small number of component parts, and which requires no attention once a selection of the desired temperature is made unless one desires to change the temperature of the mixture and/or the rate at which the mixture is introduced into or discharged from the valve.

Another object of the invention is to provide a valve of the just outlined characteristics which is particularly suited as a mixer for cold and hot water, which is adapted to automatically compensate for eventual fluctuations in the rate of hot or cold water flow, and which is especially suited to be used as a so-called concealed valve by being installed in and completely received within the wall of a kitchen, a doctor's office, a bathroom, or any other locality where a fluid having a given temperature must be available for continuous or intermittent use.

With the above objects in view, the invention resides in the provision of a mixing valve comprising a preferably upright tubular housing which is formed with an internal mixing chamber, with two preferably radial inlets for the entry of a cooler and a warmer fluid, and with a preferably radially extending outlet which communicates with the mixing chamber to permit evacuation of the fluid mixture therefrom, a regulating member wihch is axially reciprocably received in the housing and is formed with a bore which communicates with the inlet for one of the fluids and with the mixing chamber to permit the flow of the one fluid to the chamber, a supporting member which is provided in the housing and forms with the regulating member a passage of variable cross-sectional area communicating with the other inlet and with the mixing chamber so that the other fluid may flow to the mixing chamber at a rate determined by the momentary cross-sectional area of the passage, the cross-sectional area of this passage being variable by the regulating member when the latter is reciprocated in the housing, first resilient means for biasing the regulating member in a direction to enlarge the area of the passage, and second resilient means for biasing the regulating member in the opposite direction so as to reduce the area of the aforementioned passage, this second resilient means being coaxial with the regulating member, mounted in the mixing chamber and comprising at least one bimetallic thermostat whose bias upon the regulating member varies in response to temperature changes in the mixing chamber so that the axial position and the rate of flow of the other fluid through the aforementioned passage are proportional with the temperature of the fluid mixture in the mixing chamber.

It is preferred to provide a control member which forms with the regulating member a second passage through which the one fluid must pass on its way to the mixing chamber, the cross-sectional area of this second passage increasing automatically when the area of the first mentioned passage is reduced in response to the increased bias of the thermostatic resilient means, and vice versa, so that the movements of the regulating member under or counter to the bias of the second resilient means simultaneously control the rate of flow of the first and of the second fluid.

Certain other important features of the invention reside in the provision of means for arbitrarily adjusting the bias of the second resilient means by moving an axially reciprocable first abutment means for the second resilient means with respect to a second abutment means provided on the regulating member, in the provision of means for arbitrarily adjusting the position of the control member and for thereby varying the combined rate of flow of warmer and cooler fluid to the mixing chamber, in the provision of one-way valves which control the flow of the fluids from the respective inlets to the respective passages, and in the provision of specially constructed and mounted temperature selecting handgrip means for axially moving the control member with respect to the regulating member.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

Figure 1:
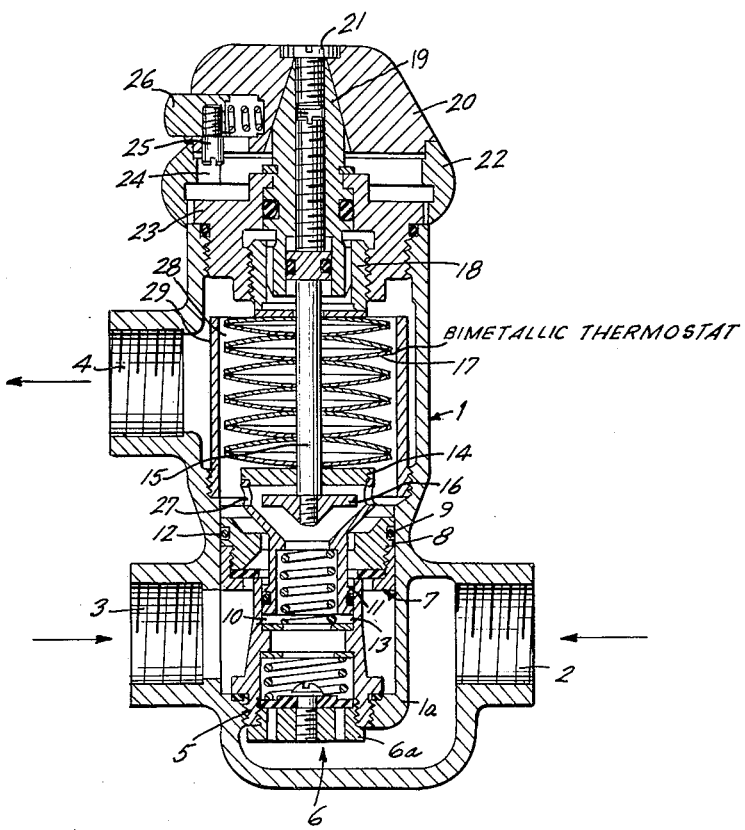
FIG. 1 is an axial section through a thermostatic mixing valve embodying my invention.
Figure 3:
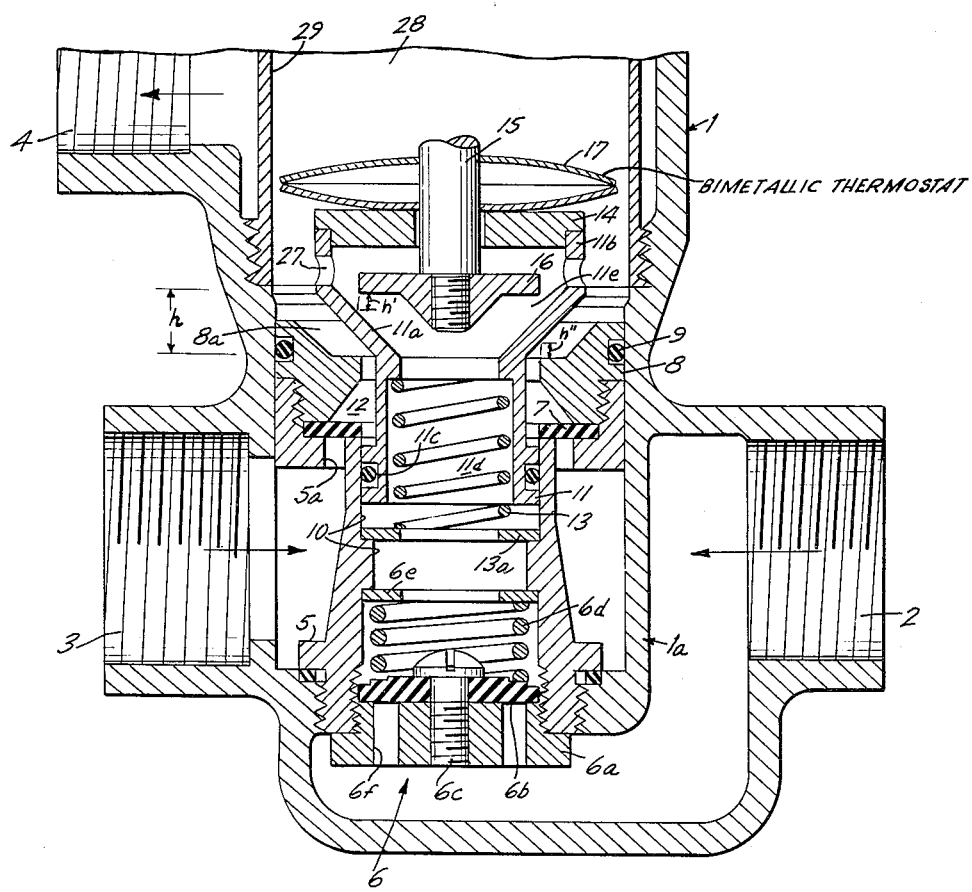
FIG. 3 is an enlarged fragmentary detail view of the lower part of the structure shown in FIG. 1.

Referring now in greater detail to the illustrated embodiment, and first to FIG. 1, there is shown a thermostatic mixing valve which comprises an upright tubular housing 1 formed with two preferably coaxial inlets in the form of internally threaded radially extending nipples 2, 3 and with an outlet in the form of an internally threaded radially extending nipple 4. The housing 1 is preferably a one-piece structure wherein all cooperating parts are coaxially aligned with each other. In the lower part of the housing, there is provided a partition 1a which separates the inlet 2 from the inlet 3 and which is formed with a tapped bore for an externally threaded tubular member 5 which latter serves as a supporting means for a pair of one-way non-return valves 6, 7 and as a guide for axial reciprocatory movements of a regulating member 11. The valve 6 comprises an externally threaded channeled plug 6a which is screwed into the internally threaded lower end of the supporting member 5 (see FIG. 3) and which carries a multiple-flap valve member 6b secured thereto by a screw 6c. The flaps of the valve member 6b are biased into abutment with the upper end face of the plug 6a by a resilient element here shown as a helical spring 6d whose upper end bears against an annular stop 6e abutting against a radial shoulder formed in the member 5. Thus, the valve member 6b may permit the flow of a fluid entering through the inlet 2 and passing upwardly through the channels 6f formed in the plug 6a and into the bore 10 of the member 5 when the fluid pressure overcomes the bias of the spring 6d, but the valve 6 always prevents return flow of fluid from the bore 10 toward the inlet 2.

The supporting member 5 comprises an upper portion in the form of an externally threaded annular plug 8 which is screwed into the internally threaded upper end of the main body portion of the supporting member, the plug 8 serving as a means for clamping the peripheral portion of an annular elastic diaphragm shaped valve 7 against an internal shoulder of the supporting member. The upper portion of the plug 8 is provided with a circumferential groove for a sealing gasket or O-ring 9 which engages the inner side of the housing 1 and prevents leakage of a fluid entering through the inlet 3. The main body portion of the member 5 is formed with axially parallel channels 5a which are normally sealed by the valve 7, the latter adapted to yield to a given pressure of fluid entering through the inlet 3 so that the fluid may flow upwardly through an annular chamber 12 formed in the plug 8 above the valve 7. The fluid admitted by the valve member 6b may flow upwardly through the axial bore 10 of the supporting member 5 and through the lower or intake end of an axial bore 11d formed in the annular regulating member 11 which latter is coaxially received in the upper part of the supporting member. The regulating member 11 extends upwardly through and beyond the annular plug 8 of the supporting member and defines with the plug an annular passage 8a for the flow of fluid admitted by the valve 7. In the bore 10 of the supporting member 5, there is provided a resilient biasing means in the form of a helical spring 13 whose lower end bears against an annular stop 13a resting on an internal shoulder of the supporting member and whose upper end bears against an internal shoulder of the regulating member 11 so that the latter is permanently biased in upward direction, i.e. in a direction to enlarge the cross-sectional area of the annular passage 8a. It will be noted that the inner annular portion of the valve 7 normally rests against that portion of the supporting member 5 which is located radially inwardly from the channels 5a.

The upper portion of the regulating member 11 assumes the shape of a hollow upwardly and outwardly diverging cone 11a which carries a cylindrical sleeve 11b; the latter is formed with at least one but preferably more radially extending ducts 27 which constitute the discharge end of the bore 11d and through which the fluid admitted by the valve 6 and flowing upwardly through the bores 10 and 11d may enter the mixing chamber 28 defined by the housing above the plug 8. The fluid admitted by the valve 7 flows upwardly through the annular chamber 12, through the annular passage 8a formed between the plug 8 and the outer side of the conical portion 11a, and into the mixing chamber 28.

The upper end of the sleeve 11b is closed by an abutment means in the form of a cover plate 14 which is formed with an axial bore for a spindle 15, the latter's lower end extending into the interior of the parts 11a, 11b and carrying a control member in the form of a disk 16 adapted to cooperate with the inner side of the conical portion 11a and to vary the cross-sectional area of the passage 11e through which the fluid admitted at 2 and passing through the valve 6 may flow toward the ducts 27. It is assumed that the inlet 2 is connected with a source of cooler fluid and that the other inlet 3 is connected with a source of warmer fluid.

The diameter of the control member 16 preferably equals or at least approximates the diameter of the annular passage 8a as well as the diameter of the bore 10 in the supporting member 5. Such construction insures complete pressure equalization in the regulating member 11 in both directions and eliminates the influence of pressure differences in the water main system. It will be noted that the lower portion of the regulating member 11 is axially slidably telescoped into the opening 10 and is formed with an external annular groove for a sealing gasket 11c which prevents the flow of fluid between the bore 10 and the chamber 12.

The composite bimetallic thermostat 17 consists of coaxial dished bimetallic springs which are formed with axial apertures permitting axial movements of the spindle 15. The springs of the thermostat 17 are arranged above the abutment means 14, and the uppermost dished spring is adjacent to the underside of a second abutment means here shown as an externally threaded compressing member or plug 18 which is received in the tapped bore of a hollow cover 23, the latter screwed into the upper end of the housing 1 (see FIG. 2). As shown, the bore of the bore of the abutment means 18 receives the lower end of an internally threaded carrier or guide 19 which meshes with the externally threaded upper end of the spindle 15. The carrier 19 serves as a means for permitting axial movements of the spindle and of the control member 16 with respect to the conical portion 11a and for thereby arbitrarily varying the area of the passage 11e. The connection between the abutment means 18 and the carrier 19 may comprise one or more radial ribs 18a provided on the means 18 and extending into axially parallel slots 19a formed in the carrier 19 so that the abutment means 18 must participate in angular movements of the carrier to be axially shifted with respect to the spindle 15. The carrier 19 is rotatable in the cover 23 and is held against axial movements with respect thereto by a split ring 19b or the like. The upper end of the carrier 13 receives a screw 21 which may be removed by a screwdriver to provide access to the slotted upper end of the spindle 15 whereby the spindle may be rotated with respect to the carrier 19 in order to move the control member 16 closer to or further away from the conical portion 11a and to thereby arbitrarily regulate the flow of cooler fluid toward the ducts 27.

Figure 2:
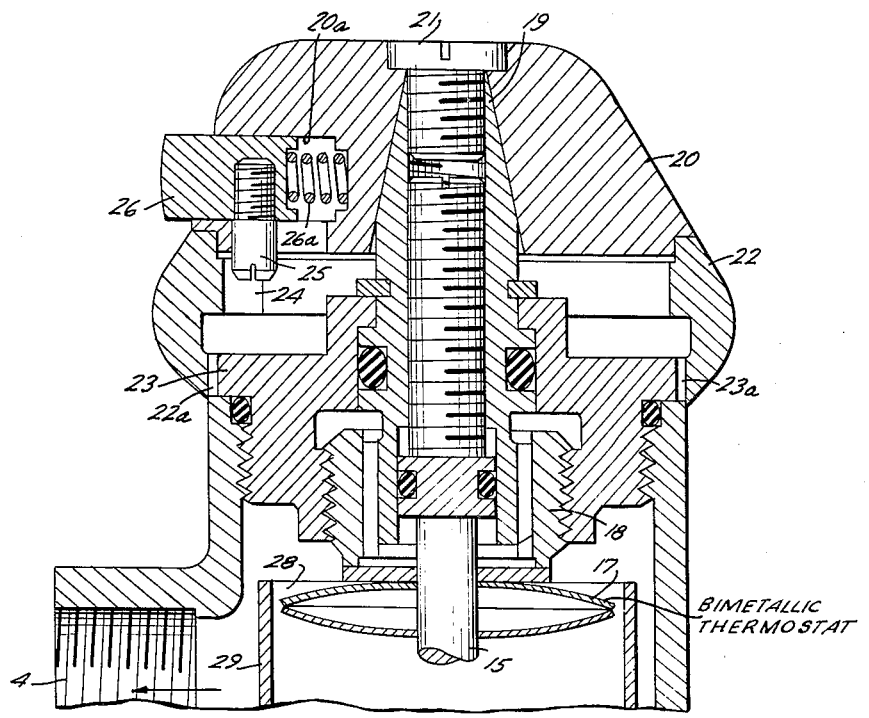
FIG. 2 is an enlarged fragmentary detail view of the upper part of the structure shown in FIG. 1.

The carrier 19 is rigidly secured to a temperature selecting handgrip means in the form of a knob 20 which is rotatable with respect to a ring 22 fixed to the cover 23 of the housing 1. For example, the connection between the carrier 19 and the knob 20 may consist solely of the aforementioned screw 21, or the knob may be press-fitted onto the conical upper end of the carrier. The ring 22 may be provided with graduations which indicate the angular position of the knob 20 and of the carrier 19. As shown in FIG. 2, the lower end of the ring 22 may be formed with axially parallel internal ribs 22a which enter into complementary grooves 23a on the cover 23 to prevent angular movements of the ring.

The knob 20 is provided with arresting means which releasably holds the carrier 19 in a selected angular position by connecting the knob with the ring 22. This arresting means comprises a manually operable pushbutton 26 which is reciprocable in a radial groove 20a of the knob and which is biased outwardly by a spring 26a. The pushbutton carries a downwardly extending set screw 25 which normally extends into one of several radially extending internal recesses 24 (only one shown in FIG. 2) which are formed in the ring 22 and which cooperate with the set screw 25 to normally prevent angular movements of the knob 20. The latter may be turned upon depression of the pushbutton 26 against the bias of the spring 26a because the screw 25 is then withdrawn from its selected recess 24 and permits rotation of the knob together with the carrier 19 and abutment means 18. When the knob 20 rotates, the abutment means 18 is moved with respect to the abutment means 14 by being expelled from or by being withdrawn into the lower end of the cover 23, and thereby varies the compression of the thermostat 17, the latter causing a corresponding axial displacement of the regulating member 11 in order to admit a different quantity of colder and warmer fluid from the chamber 12 into the mixing chamber 28.

The chamber 28 preferably receives a tubular element in the form of an upwardly opening cylinder 29 which acts as a baffle by surrounding the thermostat 17 and by preventing direct outflow of the warmer fluid through the outlet 4. In other words, the cylinder 29 compels the fluids admitted to the chamber 28 to be thoroughly intermixed before the mixture can overflow the cylinder on its way to the outlet 4. Such arrangement insures that the thermostat 17 will properly detect the temperature of the mixture and will automatically adjust the axial position of the regulating member 11 in the event that the temperature of the fluid mixture deviates from the preselected temperature.

It will be noted that the ducts 27 discharge cooler fluid directly into the stream of warmer fluid flowing upwardly toward the thermostat 17 so that the two fluids begin to mix even before they start to flow upwardly through the cylinder 29. Such arrangement prevents direct contact between the warmer fluid and the springs of the thermostat 17.

The mixing valve operates as follows:

It is assumed that the valve is utilized for mixing cold water admitted at 2 and hot water admitted at 3, and that the mixture of hot and cold water discharged at 4 is connected to a conduit leading to a sink, to a bathtub or the like. The conduit connected with the outlet 4 contains a faucet or another flow regulating means, not shown.

The cold water enters at a pressure necessary to overcome the bias of the spring 6d and flows through the valve 6, through the bores 10, 11d and through the annular passage 11e between the control member 16 and the conical portion 11a of the regulating member 11 to be discharged through the ducts 27 and into the mixing chamber 28 within the cylinder 29. The axial position of the spindle 15 and hence of the control member 16 determines the rate at which the cold water may flow from the bore 10 through the bore 11d and through the passage 11e toward the ducts 27 in that this spindle maintains the member 16 at a given axial distance $h'$ from the inner side of the portion 11a. The axial position of the spindle 15 is adjusted by an operator upon removal of the screw 21, and the axial position of the spindle thereupon remains unchanged.

The warm water entering through the inlet 3 flows through the valve 7 and through the annular passage 8a upwardly through the open lower end of the cylinder 29 into the chamber 28 to be admixed to the cold water entering through the ducts 27. The bias of the bimetallic thermostat 17 upon the abutment means 14 counteracts the bias of the spring 13 and is determined by the temperature of the mixture in the chamber 28. It is assumed that the curvature of the dished springs and hence the axial length of the thermostat 17 increases in response to a rise in temperature of the water mixture so that the thermostat shifts the regulating member 11 in downward direction and reduces the inflow of warm water by reducing the area of the annular passage 8a to lower the temperature of the mixture formed in the chamber 28. Thus, the thermostat 17 and the spring 13 maintain the regulating member 11 in a given axial position so that the inflow of warm water to the chamber 28 remains proportional with the inflow of cold water and that the temperature of the mixture discharged through the outlet 4 remains unchanged. By shifting the regulating member 11, the thermostat 17 changes the axial distance $h''$ between the outer side of the conical portion 11a and the upper edge of the wall bounding the annular passage 8a.

If an operator desires to arbitrarily change the temperature of the mixture, he depresses the pushbutton 26 and rotates the knob 20 in order to axially move the abutment means 18 with respect to the abutment means 14 and to thereby adjust the initial bias of the thermostat 17 which compels the regulating member 11 to assume a new axial position corresponding to a new ratio in the rate of flow of cold water to the rate of flow of warm water, i.e. the operator then establishes a new ratio between the distances $h'$ and $h''$. As stated before, the rate at which the cold water flows into the mixing chamber 28 may be arbitrarily adjusted by turning the spindle 15 with respect to the carrier 19. In fact, the flow of cold and hot water may be shut off entirely if the spindle 15 is moved downwardly to such an extent that the control member 16 enters into sealing abutment with the inner side of the conical portion 11a and if the spindle simultaneously moves the conical portion 11a into sealing abutment with the wall of the annular passage 8a to thereby reduce to zero not only the distance $h'$ but also the distance $h''$.

As a rule, the axial position of the control member 16 is adjusted before any hot water is admitted to the mixing chamber 28. When the thermostat 17 expands and shifts the regulating member 11 in downward direction, the abutment means 14 moves closer to the control member 16 and the cross-sectional area of the annular passage 11e between the control member and the conical portion 11a increases together with the distance $h'$; this means that the flow of cold water from the bore 10 to the ducts 27 is increased. Such movement of the regulating member 11 with respect to the control member 16 is utilized for more rapidly restoring the temperature of the mixture in the chamber 28 by increasing the rate of cold water flow simultaneously with a decrease in the rate of warm water flow, or vice versa. As the thermostat 17 expands, it moves the conical portion 11a of the regulating member 11 toward the upper edge of the wall bounding the annular passage 8a to reduce the distance $h''$ and to thereby reduce the inflow of warmer water. In other words, the thermostat 17, the regulating member 11 and the resilient means 13 cooperate to automatically reduce the rate of inflow of warm water simultaneously with an increase in the rate at which the cold water is admitted when the temperature of the fluid mixture in the chamber 28 increases. The operation of the mixing valve is reversed when the temperature of the fluid mixture drops, i.e. the conical portion 11a then reduces the inflow of cold water and simultaneously increases the inflow of warm water.

The novel mixing valve is particularly suited for use as a so-called continuous flow valve in that it permits a continuous flow of a cooler fluid and of a warmer fluid into the chamber 28, and also permits continuous discharge of the fluid mixture through the outlet 4. As stated before, the conduit connected to the outlet 4 contains a faucet or another type of flow regulating means.

The distance $h$ between the lower edge of the control member 16 and the upper edge of the wall bounding the annular passage 8a equals the combined distance $h'+h''$ and the length of the axial section through the conical portion 11a. Once the axial position of the spindle 15 is adjusted, the distance $h$ remains unchanged. The thermostat 17 merely changes the ratio between the distance $h'$ and $h''$ depending on the temperature of the fluid mixture in the chamber 28. Any turning of the knob 20 will bring about intentional changes in the ratio of distance $h'$ to the distance $h''$ with attendant changes in the temperature of the fluid mixture. On the other hand, any changes in the axial position of the spindle 15 and of the control member 16 will result in a change in the rate of cold water flow independently of the rate at which the warmer water is admitted through the annular passage 8a. Thus, the adjustments in the rate of cold water flow may be carried out independently of the axial position of the regulating member 11.

Each of the fluids admitted at 2 or 3 may already constitute a mixture of two or more fluids.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. A valve for proportionally mixing a warmer and a cooler fluid so that the resultant fluid mixture is maintained at a substantially constant temperature, comprising a housing defining an internal mixing chamber and having a first inlet for admitting the cooler fluid, a second inlet for admitting the warmer fluid, and an outlet for permitting evacuation of the fluid mixture from said chamber; a regulating member axially reciprocably mounted in said housing and having a central bore communicating only with said first inlet and with said chamber so that the cooler fluid may flow through said bore and into said chamber; stationary supporting means provided in said housing and defining with said member an annular passage whose cross-sectional area is variable in response to axial movements of said member, said passage communicating only with said second inlet and with said chamber so that the warmer fluid may flow through said passage and into said chamber to form a fluid mixture with the cooler fluid; first resilient means for biasing said member in a direction to increase the area of said passage and to thereby increase the rate of flow of warmer fluid to said chamber; and second resilient means provided in said chamber for biasing said member in a direction to reduce the area of said passage and to thereby reduce the rate of flow of warmer fluid to said chamber, said second resilient means coaxial with said member and comprising at least one bimetallic thermostat which is fully accommodated in said chamber and whose bias upon said member increases in response to a rise in temperature of the fluid mixture in said chamber whereby the area of said passage and the rate of flow of warmer fluid are reduced automatically in response to a rise in the temperature of the fluid mixture.

2. A valve for proportionally mixing a warmer and a cooler fluid so that the resultant fluid mixture is maintained at a substantially constant temperature, comprising a housing defining an internal mixing chamber and having a first inlet for admitting the cooler fluid, a second inlet for admitting the warmer fluid, and an outlet for permitting evacuation of the fluid mixture from said chamber; a regulating member axially reciprocably mounted in said housing and having a bore communicating only with said first inlet and with said chamber so that the cooler fluid may flow through said bore and into said chamber; stationary supporting means provided in said housing and defining with said member an annular passage whose cross-sectional area is variable in response to axial movements of said member, said passage communicating only with said second inlet and with said chamber so that the warmer fluid may flow through said passage and into said chamber to form a fluid mixture with the cooler fluid; first resilient means for biasing said member in a direction to increase the area of said passage and to thereby increase the rate of flow of warmer fluid to said chamber; second resilient means provided in said chamber for biasing said member in a direction to reduce the area of said passage and to thereby reduce the rate of flow of warmer fluid to said chamber, said second resilient means coaxial with said member and comprising at least one bimetallic thermostat which is fully accommodated in said chamber and whose bias upon said member increases in response to a rise in temperature of the fluid mixture in said chamber whereby the area of said passage and the rate of flow of warmer fluid are reduced automatically in response to a rise in the temperature of the fluid mixture; and a control member defining with said regulating member a second passage for the flow of the cooler fluid from said bore to said chamber, the cross-sectional area of said second passage variable in response to axial movements of said regulating member and the area of said second passage increasing in response to a movement of said regulating member under the bias of said second resilient means whereby the rate of flow of cooler fluid to said chamber is increased in response to a rise in the temperature of the fluid mixture.

3. A valve for proportionally mixing a warmer and a cooler fluid so that the resultant fluid mixture is maintained at a substantially constant temperature, comprising a housing defining an internal mixing chamber and having a first inlet for admitting the cooler fluid, a second inlet for admitting the warmer fluid, and an outlet for permitting evacuation of the fluid mixture from said chamber; a regulating member axially reciprocably mounted in said housing and having a bore communicating only with said first inlet and with said chamber so that the cooler fluid may flow through said bore and into said chamber; stationary supporting means provided in said housing and defining with said member an annular passage whose cross-sectional area is variable in response to axial movements of said member, said passage communicating only with said second inlet and with said chamber so that the warmer fluid may flow through said passage and into said chamber to form a fluid mixture with the cooler fluid; first resilient means for biasing said member in a direction to increase the area of said passage and to thereby increase the rate of flow of warmer fluid to said chamber; second resilient means provided in said chamber for biasing said member in a direction to reduce the area of said passage and to thereby reduce the rate of flow of warmer fluid to said chamber, said second resilient means coaxial with said member and comprising at least one bimetallic thermostat which is fully accommodated in said chamber and whose bias upon said member increases in response to a rise in temperature of the fluid mixture in said chamber whereby the area of said passage and the rate of flow of warmer fluid are reduced automatically in response to a rise in the temperature of the fluid mixture; first abutment means provided on said regulating member for said second resilient means; second abutment means for said second resilient means, said second abutment means spaced from said first abutment means; and means for moving said second abutment means with respect to said first abutment means and for thereby changing the bias of said second resilient means independently of the temperature of the fluid mixture in said chamber.

4. A valve as set forth in claim 3, wherein said second abutment means is formed with external threads and the housing comprises an internally threaded cover meshing with said second abutment means, said moving means comprising handgrip means connected with said second abutment means for rotating the same with respect to said cover and for thereby moving the second abutment means toward and away from said first abutment means.

5. A valve for proportionally mixing a warmer and a cooler fluid so that the resultant fluid mixture is maintained at a substantially constant temperature, comprising a housing defining a mixing chamber and having a first inlet for admitting one of the fluids, a second inlet for admitting the other fluid, and an outlet for permitting evacuation of the fluid mixture from said chamber; a regulating member axially reciprocably received in said housing and having a bore communicating only with said first inlet and with said chamber so that the one fluid may flow through said bore and into said chamber; stationary supporting means provided in said housing and defining with said member a passage whose cross-sectional area is variable in response to axial reciprocation of said member, said passage communicating only with said second inlet and with said chamber so that the other fluid may flow through said passage and into said chamber to form a fluid mixture with the first fluid; first resilient means for biasing said member in a direction to increase the area of said passage and to thereby increase the rate of flow of the other fluid to said chamber; second resilient means provided in said chamber for biasing said member in a direction to reduce the area of said passage and to thereby reduce the rate of flow of the other fluid to said chamber, said second resilient means coaxial with said member and comprising a plurality of coaxial substantially circular dished bimetallic thermostats which are fully accommodated in said chamber and whose bias upon said member varies in response to changes in the temperature of the fluid mixture in said chamber whereby the area of said passage and the rate of flow of the other fluid to said chamber are varied in dependency on the temperature of the fluid mixture, said thermostats having concentric apertures; a spindle extending through said apertures and into said regulating member; and a control member connected to said spindle, said control member defining with said regulating member a second passage for the flow of the one fluid from said bore to said chamber and the configuration of said regulating member being such that the cross-sectional area of said second passage is reduced when the regulating member is moved under the bias of said first resilient means but increases when the regulating member is moved under the bias of the second resilient means whereby the rate of flow of the first fluid to said chamber increases when the rate of flow of the second fluid is reduced, and vice versa.

6. A valve as set forth in claim 5, wherein said spindle is formed with external threads and further comprising carrier means for axially movably supporting said spindle in said housing whereby, upon axial movement of said spindle with said control member, the area of said second passage may be changed independently of the bias of said second resilient means.

7. A valve as set forth in claim 6, wherein said spindle is coaxial with said first and second biasing means, with said supporting means, with said control member and with said regulating member.

8. A valve for proportionally mixing a warmer and a cooler fluid so that the resultant fluid mixture is maintained at a substantially constant temperature, comprising a housing defining an internal mixing chamber and having a first inlet for admitting the cooler fluid, a second inlet for admitting the warm fluid, and an outlet for permitting evacuation of the fluid mixture from said chamber; a regulating member axially reciprocably mounted in said housing and comprising a hollow conical portion, said regulating member formed with a bore having an intake end communicating only with said first inlet, said bore extending through said conical portion and having a discharge end communicating only with said chamber so that the cooler fluid may flow through said bore and into said chamber; stationary supporting means provided in said housing, said supporting means surrounding said regulating member and defining with the outer side of said conical portion an annular passage whose cross-sectional area is variable in response to axial movements of said member, said passage communicating only with said second inlet and with said chamber so that the warmer fluid may flow through said passage and into said chamber to form a fluid mixture with the cooler fluid; first resilient means for biasing said member in a direction to increase the area of said passage and to thereby increase the rate of flow of warmer fluid to said chamber; second resilient means provided in said chamber for biasing said member in a direction to reduce the area of said passage and to thereby reduce the rate of flow of warmer fluid to said chamber, said second resilient means coaxial with said member and comprising at least one bimetallic thermostat which is fully accommodated in said chamber and whose bias upon said member increases in response to a rise in temperature of the fluid mixture in said chamber whereby the area of said passage and the rate of flow of warmer fluid are reduced automatically in response to a rise in the temperature of the fluid mixture; and a control member extending into said regulating member and defining with the inner side of said conical portion a second annular passage for the flow of cooler fluid from said intake end to said discharge end, the cross-sectional area of said second passage variable in response to axial movement of said regulating member with respect to said control member and the area of said second passage increasing when the regulating member is moved under the bias of said second resilient means whereby the rate of flow of the cooler fluid to said chamber increases in response to a rise in the temperature of the fluid mixture, and vice versa.

9. A valve for proportionally mixing a warmer and a cooler fluid so that the resultant fluid mixture is maintained at a substantially constant temperature, comprising an upright housing defining a mixing chamber and having a first radial inlet for admitting one of the fluids, a second radial inlet for admitting the other fluid, and a radial outlet for permitting evacuation of the fluid mixture from said chamber; a regulating member axially reciprocably received in said housing and having a bore communicating only with said first inlet and with said chamber so that the one fluid may flow through said bore and into said chamber; stationary supporting means provided in said housing and defining with said member a passage whose cross-sectional area is variable in response to axial reciprocation of said member, said passage communicating only with said second inlet and with said chamber so that the other fluid may flow through said passage and into said chamber to form a fluid mixture with the first fluid; first resilient means for biasing said member in a direction to increase the area of said passage and to thereby increase the rate of flow of the other fluid to said chamber; and second resilient means provided in said chamber for biasing said member in a direction to reduce the area of said passage and to thereby reduce the rate of flow of the other fluid to said chamber, said second resilient means coaxial with said member and comprising at least one bimetallic thermostat which is fully accommodated in said chamber and whose bias upon said member varies in respose to changes in the temperature of the fluid mixture in said chamber whereby the area of said passage and the rate of flow of the other fluid to said chamber are varied in dependency on the temperature of the fluid mixture.

10. A valve as set forth in claim 9, further comprising cylindrical baffle means disposed between said outlet and said chamber and surrounding said second resilient means, said baffle means having a first end in communication with said passage and said bore and a second end in communication with said outlet so that the fluids entering said baffle means are thoroughly intermixed before the fluid mixture is discharged into said outlet.

11. A valve for proportionally mixing a warmer and a cooler fluid so that the resultant fluid mixture is maintained at a substantially constant temperature, comprising a housing defining an internal mixing chamber and having a first inlet for admitting the cooler fluid, a second inlet for admitting the warmer fluid, and an outlet for permitting evacuation of the fluid mixture from said chamber; a regulating member axially recoprocably mounted in said housing and having a bore communicating only with said first inlet and with said chamber so that the cooler fluid may flow through said bore and into said chamber; stationary supporting means provided in said housing and having a coaxial bore reciprocably receiving a portion of said member, said supporting means defining with said member an annular passage whose cross-sectional area is variable in response to axial movements of said member, said passage communicating only with said second inlet and with said chamber so that the warmer fluid may flow through said passage and into said chamber to form a fluid mixture with the cooler fluid; first resilient means for biasing said member in a direction to increase the area of said passage and to thereby increase the rate of flow of warmer fluid to said chamber; second resilient means provided in said chamber for biasing said member in a direction to reduce the area of said passage and to thereby reduce the rate of flow of warmer fluid to said chamber, said second resilient means coaxial with said member and comprising at least one bimetallic thermostat which is fully accommodated in said chamber and whose bias upon said member increases in response to a rise in temperature of the fluid mixture in said chamber whereby the area of said passage and the rate of flow of warmer fluid are reduced automatically in response to a rise in the temperature of the fluid mixture; and a disk-shaped control member defining with said regulating member a second annular passage for the flow of cooler fluid from said first named bore to said chamber, the cross-sectional area of said second passage variable in response to axial movements of said regulating member and the area of said second passage increasing in response to a movement of said regulating member under the bias of said second resilient means whereby the rate of flow of cooler fluid to said chamber is increased in response to a rise in the temperature of the fluid mixture, the diameter of said control member at least approximating the diameter of the bore in said supporting means.

References Cited in the file of this patent

UNITED STATES PATENTS

| | | |
|---|---|---|
| 1,834,375 | Bletz | Dec. 1, 1931 |
| 2,382,283 | Barnett | Aug. 14, 1945 |
| 2,657,859 | Wangenheim | Nov. 3, 1953 |
| 2,657,860 | Schmidt | Nov. 3, 1953 |

FOREIGN PATENTS

| | | |
|---|---|---|
| 1,055,311 | Germany | Apr. 16, 1959 |
| 737,960 | Great Britain | Oct. 5, 1955 |